United States Patent [19]

Nowicki et al.

[11] Patent Number: 5,252,155
[45] Date of Patent: Oct. 12, 1993

[54] SHRINK FILM LABELING WITH POLYURETHANE HOT MELTS

[75] Inventors: James Nowicki, Hopewell, N.J.; Francis X. Brady, Bucks, United Kingdom; James N. O'Leary, Hackettstown, N.J.

[73] Assignee: National Starch and Chemical Investment Holding Corporation, Bridgewater, N.J.

[21] Appl. No.: 849,119

[22] Filed: Mar. 10, 1992

[51] Int. Cl.$^5$ .............................................. B32B 31/26
[52] U.S. Cl. ......................................... 156/84; 156/85; 156/86; 156/325; 156/331.7
[58] Field of Search ..................... 156/84, 85, 86, 325, 156/331.7

[56] References Cited

U.S. PATENT DOCUMENTS

| | | | |
|---|---|---|---|
| 3,235,433 | 2/1966 | Cvacho et al. | 156/229 |
| 3,542,229 | 11/1970 | Beyerlein et al. | 215/1 |
| 3,604,584 | 9/1971 | Shank, Jr. | 215/12 R |
| 3,659,394 | 5/1972 | Hartleib et al. | 53/33 |
| 3,734,273 | 5/1973 | Watanabe | 206/46 FC |
| 3,822,459 | 7/1974 | Amberg et al. | 29/208 B |
| 3,931,077 | 1/1976 | Uchigaki et al. | 260/26 |
| 4,108,710 | 8/1978 | Hoffmann | 156/450 |
| 4,126,238 | 11/1978 | Rausing | 215/1 C |
| 4,138,026 | 2/1979 | Conklin | 215/12 R |
| 4,568,580 | 2/1986 | Ghirardello et al. | 428/35 |
| 4,618,651 | 10/1986 | Gilch et al. | 525/130 |
| 4,704,173 | 11/1987 | Hoffman | 156/86 |
| 4,762,748 | 8/1988 | Oberle | 428/349 |
| 4,775,719 | 10/1988 | Markevka et al. | 525/125 |
| 4,808,255 | 2/1989 | Markevka et al. | 156/307.3 |
| 4,844,957 | 7/1989 | Hoffman | 428/34.7 |
| 4,966,805 | 10/1990 | Ezawa et al. | 428/212 |
| 5,021,507 | 6/1991 | Stanley et al. | 525/127 |
| 5,091,239 | 2/1992 | Przeworski et al. | 156/86 |
| 5,175,032 | 12/1992 | Steele et al. | 156/86 |

FOREIGN PATENT DOCUMENTS 58-007532 2/1983 Japan .
63-151381 6/1988 Japan .

*Primary Examiner*—Caleb Weston
*Attorney, Agent, or Firm*—Ellen T. Dec

[57] ABSTRACT

A process for applying heat shrink film to containers comprising the steps of a) coating at least a portion of a heat shrinkable but unshrunken film segment with a reactive hot melt polyurethane adhesive having a free isocyante content greater than 2% and a viscosity less than 3000 cps at 225° F.; b) applying the film to the longitudinal surface of the container; and, c) subjecting the container to heat to shrink the film onto the container so as to permanently affix it thereto.

10 Claims, No Drawings

SHRINK FILM LABELING WITH POLYURETHANE HOT MELTS

The present invention is directed to an improved method for applying heat shrink film to containers wherein the film is adhered to the container surface using a reactive urethane hot melt adhesive composition.

There has been a trend in the packaging industry, and particularly in the beverage segment thereof, to replace inventory stock of lithographically preprinted cans with blank cans which can be filled as desired, the specific labeling being done by applying to the container a printed label formed from a heat shrink film some time soon before or after the filling operation. This technique is particularly attractive, for example, to breweries who often bottle and package their products under a variety of trade names. By utilizing the shrink labeling process, these bottlers would no longer be required to stock a large inventory of pre-printed containers for each brand and could, instead, stock only unprinted containers together with a supply of the appropriate heat shrinkable printed film labels. Moreover, the presence of the film label around the can would provide additional protection against the printed cans rubbing together during transport. Thus, surfaces of conventional lithographed cans are sufficiently abrasive such that the continuous contact with surrounding cans during shipping after causes small holes to be found in the cans, resulting in "leakers" which must be discarded.

Initially these labeling operations were carried out using processes and methods such as described in U.S. Pat. No. 3,822,459 issued Jul. 9, 1974, to Aveberg et al. These earlier processes required the formation of a tube or sleeve of the heat shrink film which was then placed over the container and heated in order to shrink the film to conform to the size and shape of the container. Recently Hoffman, in U.S. Pat. Nos. 3,765,991; 3,834,963; 4,108,710; 4,704,173; and 4,844,957, has proposed a process which does not require a preformed sleeve and permits the application of the film directly from a continuous roll of film material onto the container.

Both techniques, but especially the high speed continuous operation such as described by Hoffman, require the use of an adhesive which will form an adequate bond between the container and the label. More specifically, the bond must be such that it will not shrink and separate at the seam during the heat shrinking step. The bond should also form a smooth coating which will not bubble or cause creasing of the film during curing.

Moreover, in many applications, the containers are subjected to heating either during hot filling (e.g., fruit juice processing) or after filling as when a separate pasteurization step is required, processes which put additional stress on the adhesive bond. When used in these processes, conventional hot melt adhesive compositions do not have adequate heat strength; as a result, the labels shrink away from the lap area so that the label becomes distorted and unappealing. Furthermore, the filled and labelled cans are also exposed to elevated temperature conditions during shipping and storage.

SUMMARY OF THE INVENTION

We have now found that the use of a reactive hot melt polyurethane adhesive having a free isocyanate (NCO) content greater than about 2% and a viscosity less than 3,000 cps at 225° F. permits satisfactory application of the heat shrink film onto the containers even at the high speeds involved in the continuous processes. The resultant bond is strong, and retains its configuration even after the heat shrinking operation and any additional pasteurization operations so that the "shoulder seams" formed at the ends of the container as well as the seam joint formed at the interface of the leading and trailing edge of the film remain in the desired configuration with no distortion of the label or undesirable exposure of the container at the seam lap.

Thus, the present invention is directed to a process for applying heat shrink film to containers comprising the steps of a) coating at least a portion of a heat shrinkable but unshrunken film segment with a reactive hot melt polyurethane adhesive having a free isocyante content greater than 2% and a viscosity less than 3000 cps at 225° F.; b) applying the film to the longitudinal surface of the container; and, c) subjecting the container to heat to shrink the film onto the container so as to permanently affix it thereto.

In a preferred embodiment, the hot melt adhesive is applied to a narrow region of the container or at the leading end of the film segment to secure the leading end of the film to the container, the film wrapped around the container and the film segment secured to the container by overlapping the trailing end, a narrow region of which has been coated with the hot melt adhesive.

Also disclosed herein are shrink labeled containers wherein the labels are affixed to the container utilizing specific reactive polyurethane adhesive compositions.

DESCRIPTION OF THE PREFERRED EMBODIMENTS

The reactive urethane prepolymers are prepared by the condensation polymerization of a polyisocyanate with a polyol, most preferably the polymerization of a diisocyante with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the mono-substituted esters of glycerol.

In addition, the urethane prepolymers may be prepared by the reaction of a polyisocyanate with a polyamino or a polymercapto-containing compound such as diamino polypropylene glycol or diamino polyethylene glycol o polythioethers such as the condensation products of thiodiglycol either alone or in combination with other glycols such as ethylene glycol, 1,2-propylene glycol or with other polyhydroxy compounds disclosed above. Also, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like. Mixtures of more than one polyol, polyamino or polymercapto-containing compound may also be used.

Any suitable organic polyisocyanate may be used such as, for example, ethylene diisocyanate, ethylidene diisocyanate, propylene diisocyanate, butylene diisocyanate, hexamethylene diisocyante, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane- 4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenylmethane-2,2'5,5-tetraisocyanate, and the like.

The polyisocyanate and polyol, polyamino or polymercapto components are combined in proportions so as to yield a urethane prepolymer characterized by a free isocyanate content of from about 2 to about 15%, preferably 2 to about 10%, and most preferably from 2 to 9%. In addition, the ratio of isocyanate equivalents to hydroxyl, amino or mercapto equivalents (known as the isocyanate index) should be greater than 1 but no more than about 3.5. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 55% of the final prepolymer.

Preferably, the hot melt adhesive additionally contains a vinyl polymer which, in combination with the other adhesive components, provides additional green strength to the composition before the final urethane bond is formed. Any polymer prepared from ethylenically unsaturated monomers capable of free radical polymerization and which do not contain active hydrogen may be used herein. Most commonly employed are polymers prepared from the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers, such as mixtures of butyl and methyl methacrylate, may also be used to prepare the polymers. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc., may be used as part of the copolymers. Depending upon the precise formulation of the adhesive, the vinyl functionality may be introduced into the urethane either by actual polymerization of the ethylenically unsaturated monomer with the urethane prepolymer or by merely blending an already polymerized polymer with the urethane prepolymer. Representative hot melt adhesives are disclosed, for example, in U.S. Pat. Nos. 3,931,077; 4,775,719; 5,021,507.

While urethane adhesives may be used "neat" in the labeling operations, they are often formulated with a compatible tackifying resin. The tackifying resins useful in the adhesive compositions can be hydrocarbon resins, hydrogenated hydrocarbons, synthetic polyterpenes, rosin esters, natural polyterpenes, and the like. More particularly, the useful tackifying resins include any compatible resins or mixtures thereof such as (1) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (2) copolymers and terpolymers of natural terpenes, e.g., styrene/terpene and alpha methyl styrene/terpene; (3) polyterpene resins having a softening point, as determined by ASTM method E28-58T, of from 60° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (4) phenolic modified terpene resins and hydrogenated derivatives thereof such, for example, as the resin product resulting from the condensation, in an acidic medium, of a bicyclic terpene and a phenol; (5) aliphatic petroleum hydrocarbon resins having a Ball and Ring softening point of from 60° to 135° C.; the latter resins resulting from the polymerization of monomers consisting primarily of olefins and diolefins; also included are the hydrogenated aliphatic petroleum hydrocarbon resins; (6) aromatic petroleum hydrocarbon resins and the hydrogenated derivatives thereof; (7) alicyclic petroleum hydrocarbon resins and the hydrogenated derivatives thereof; and (8) acrylic styrene copolymers such as Rensinall GW4-200. Mixtures of two or more of the above described tackifying resins may be required for some formulations. In order to obtain satisfactory performance during hot filling and/or after pasteurization, the tackifier is generally present at levels less than about 40% by weight of the adhesive, preferably at levels of 5 to 30%.

The reactive urethane adhesives used herein may also include other additives conventionally employed in the art such as other compatible polymers, fillers, pigments, dyes, inhibitors, antioxidants, UV absorbers, waxes and other conventional additives. The fillers may be in the form of particles or fibers of compositions including ceramics, glass, silica, quartz, mica, treated clay, titanium dioxide, boron nitrides, graphite, carbon black, glass fibers, asbestos fibers, metal powders, etc., the amount of filler depending on particular properties of the composite desired. Typical other diluents include the plasticizers such as adipates and phthalates, e.g., dioctyl adipate and dioctyl phthalates as well as ethylene carbonate and propylene carbonate.

Moreover, the adhesive compositions of the invention preferably contain a catalyst to enhance the speed of the chain extension reaction. Suitable catalysts include the known polyurethane catalysts, preferably a diorgano tin compound for example dibutyl tin dilaurate or a mercapto tin compound. In general, amounts of catalyst from 0.05% to 1% by weight based on the weight of prepolymer may be used.

The adhesive is then used to affix the heat shrink labels to the appropriate containers using conventional packaging equipment, especially that described in U.S. Pat. Nos. 4,704,173 and 4,844,957. The technique is particularly useful in the labeling of glass, metal or plastic cylindrical or multi-faceted containers using heat shrink labels made from polyolefins such as polypropylene or polyethylene or from polyvinyl chloride films or similar plastic sheets such as foamed polyethylene, polypropylene or polystyrene.

This invention can be further illustrated by the following examples of preferred embodiments thereof. although it will be understood that these examples are included merely for purposes of illustration and are not intended to limit the scope of the invention unless otherwise specifically indicated.

EXAMPLE I

A series of reactive hot melt urethane adhesives were formulated as follows:

A clean and dry glass vessel was equipped with agitation, nitrogen, a hot oil bath, a thermometer, and provisions for 200 mm Hg vacuum. Dry nitrogen was purged throughout the reaction process. All polyols, polymerized acrylic polymers and copolymers, tackifying resins, and processing aids were added to the vessel with agitation. The mixture was heated to 80°–110° C. for two hours to dissolve the polymers and tackifying resins to form a smooth solution. A small sample was smeared onto a glass slide to verify that all the polymers and tackifying resins were completely dissolved. The polyisocyanate was added to the hot liquid and agitation was continued at 80°–110° C. for two additional hours. At that point nitrogen was stopped and agitation reduced to a speed which was just sufficient to move the reaction mass. A vacuum of 200 mm Hg was applied for 15 minutes to remove entrained gas bubbles. The product was then discharged hot from the vessel into an appropriate container.

The adhesives were then subjected to the following tests.

% NCO

A direct titration of residual isocyanate is conducted with dibutyl amine (DBA). The amine group is very reactive toward the addition reaction of the isocyanate groups:

R-NCO+H-N-Bu$_2$→R—NH—CO—B—Bu$_2$.

Approximately a three gram sample of a given polyurethane reactive hot melt is weighed and dissolved in dry tetrahydrofuran (THF). Three to five drops of 1% bromocresol green indicator (in dry THF) is added to the sample. The sample is then titrated with 0.3N solution of dibutyl amine in dry toluene. During this titration samples change color from yellow to green to blue. The end-point is reached when the blue color persists for at least 15 seconds. % NCO is calculated using the following formula:

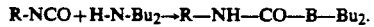

$$\% \text{ NCO} = \frac{(\text{ml of } DBA) \times (\text{Normality of } DBA) \times 4.2}{\text{Sample Weight in grams}}$$

Viscosity

Viscosity is measured using a Brookfield RVID thermoset model #DV-1 with a #27 spindle. Polyurethane reactive hot melt is premelted at 200–250 F. and 10.5 grams is poured into the cylindrical cell. The spindle is lowered into the sample and allowed to equilibrate for 30 minutes prior to recording readings. Viscosities at temperatures of 200°, 225°, and 250° F. were determined for each polyurethane reactive hot melt evaluated.

Green Peel Strength

A 6×6×0.02 inch aluminum sheet is transfer coated with a 0.5 mil layer of polyurethane reactive hot melt adhesive. A three-inch wide sheet of 2 mil thick polyethylene or polypropylene film is immediately laminated to the adhesive coating with the aid of a hand roller. The assembly is allowed to equilibrate to ambient temperatures over a period of five minutes and then evaluated for green peel strength using a hunter force gauge. A vise grip with three-inch wide wood clamps is used to connect the hunter force gauge to the lamination and distribute applied force evenly along the width of the lamination. Samples are peeled apart at a 180 degree angle of peel with the force applied linearly across the entire three-inch wide bond. Values obtained from the hunter force gauge are divided by three to arrive at a measurement in pounds per linear inch. The mode of failure is also observed and recorded.

Cured Peel Strength

Laminations are constructed and evaluated as described above, allowing the laminations to cure for a period of 24 hours at ambient conditions prior to evaluation.

Pasteurizer Performance

A 2 mil thick polyethylene or polypropylene label is transfer coated with a 0.5 mil coating of polyurethane reactive hot melt. The adhesive coated label is immediately wrapped around a blank can and a hand roller is applied gently to insure adhesive contact. The top and bottom edges are then shrunk around the can with the aid of a hand held heat gun. The assembly is allowed to cure 24 hours prior to evaluation (reactive hot melts which are catalyzed and cure faster can be evaluated in less than 24 hours). A pen line is scribed along the overlap of the label of the cured assembly which is then subjected to immersion in 160° F. water for a period of 1 hour. Any observed distortion or shrinkage in the label is indicative of unacceptable performance. Shrinkage of the label away from the scribed pen line also indicates unacceptable performance. Adhesives which met all these properties are considered to "Pass".

Comparative Compositions

For comparative purposes, the adhesives were also compared with a conventional ethylene vinyl acetate hot melt adhesive as well as with a number of one- and two-part liquid urethane adhesives.

The components and test results are shown in Table 1. In the table, MDI is a diphenyl methane diisocyanate such as Rubinate 44 from ICI; PPG 2025 is a polypropylene glycol from Arco; Dynacol 7360 is a polyester diol from Hüls; Elvacite 2013 is a butyl methacrylate (64%), methyl methacrylate (36%) available from DuPont; Vynathene is 51% vinyl acetate EVA from Quantum Chemical; Kristallex 3100 is an alpha methyl styrene polymer having a softening point of 100° C. available for Hercules; Elvax 40 is an ethylene vinyl acetate copolymer containing 40% vinyl acetate available from DuPont; Super Beckacite 2000 is a terpene phenolic resin having a softening point of 100° C. available from Arizona and Poly G 20-265 is a polypropylene glycol from Olin; Modaflow is a ethyl acrylate and ethylhexylacrylate copolymer from Monsanto.

TABLE 1

| | A | | B | | C | | D | | E | | F | | G | |
|---|---|---|---|---|---|---|---|---|---|---|---|---|---|---|
| | gm | % | gm | % | gm | % | gm | % | gm | % | gm | % | gm | % |
| MDI | 17.8 | 17.8 | 17.8 | 13 | 17.8 | 25 | | | 17.8 | 42 | 17.8 | 26 | 17.8 | 25 |
| PPG 2025 | 24.7 | 24.7 | 24.7 | 19 | 24.7 | 35 | | | 24.7 | 58 | 24.7 | 37 | 24.7 | 35 |

TABLE 1-continued

|  | A | | B | | C | | D | | E | | F | | G | |
|---|---|---|---|---|---|---|---|---|---|---|---|---|---|---|
|  | gm | % | gm | % | gm | % | gm | % | gm | % | gm | % | gm | % |
| Dynacol 7360 | 57.5 | 57.5 | 57.5 | 43 | | | | | | | | | | |
| Elvacite 2013 | | | 33.5 | 25 | | | | | | | | | | |
| Vynathene EY90425 | | | | | 10.6 | 15 | | | | | | | | |
| Kristallex 3100 | | | | | 17.7 | 25 | | | | | | | | |
| Elvax 40 | | | | | | | | | | | | | 10.6 | 15 |
| Super Beckacite 2000 | | | | | | | | | | | | | 17.7 | 25 |
| Poly G 20-265 | | | | | | | | | 25 | 37 | | | | |
| Dibutyl tin dilaurate | | | | | | | | | 0.1 | — | 0.01 | — | | |
| Conventional Hot Melt | | | | | | | 100 | 100 | | | | | | |
| Color | Translucent White | | Translucent White | | Colorless | | Colorless | | Colorless | | Colorless | | Clear Light Yellow | |
| % Free NCO | 3.5% | | 2.6% | | 7.0% | | — | | 11.7 | | — | | 7.0% | |
| Viscosity @ RT | Solid | | Solid | | Tacky Solid | | Solid | | 3,000 | | 3,000 | | Tacky Solid | |
| @200° F. | 4,400 | | 30,000 | | 10,400 | | 3,200 | | — | | — | | 6,400 | |
| @225° F. | 2,800 | | 10,000 | | 5,600 | | 1,300 | | — | | — | | 4,500 | |
| @250° F. | 1,900 | | 6,000 | | 3,400 | | 650 | | — | | — | | 2,700 | |
| Green Peel | | | | | | | | | (Nil) | | (Nil) | | | |
| @5 minutes | 0.2 | | 1.1 | | 0.8 | | 1.3 | | <0.2 | | <0.2 | | 0.4 | |
| Failure Mode | Cohesive | | Film Tear | | Adhesive fails from Aluminum | | Adhesive fails from Aluminum slight film tear | | Cohesive | | Cohesive | | Cohesive | |
| Peel Strength | 1.1 | | 1.1 | | 1.1 | | 1.3 | | 1.1 | | 0.9 | | 1.1 | |
| @24 hours Failure Mode | Film Tear | | Film Tear | | Film Tear | | Cohesive and moderate film tear | | Film Tear | | Cohesive | | Film Tear | |
| *Pasteurizer Performance | Pass | | Pass | | Pass | | Fail | | Pass | | Fail | | Pass | |

The results presented in Table I show the superior adhesion, heat and shrink resistant properties of the adhesives described herein in contrast to both a commercially available ethylene vinyl acetate hot melt adhesive (D) and also liquid urethane adhesives (E and F). Thus, while the liquid urethanes gave adequate cured bond strength, they clearly lacked the initial uncured strength required to affix the label to the container during high speed automated application and the subsequent shrinking process.

EXAMPLE II

A second series of samples were prepared and tested as shown in Table II. Additionally, the formulation designated "H" was evaluated on a high speed commercial labeling machine as described in U.S. Pat. Nos. 4,704,173 and 4,844,957. On that equipment, the adhesive coated satisfactorily and produced film destructive bonds off line in the uncured state. The resultant commercially labeled cans also survived the pasteurization performance test described above.

TABLE II

|  | H | | J | | K | |
|---|---|---|---|---|---|---|
|  | gms | % | gms | % | gms | % |
| PPG 725 | 40 | 20 | 60 | 30 | 80 | 21 |
| Dynacol 7360 | 60 | 30 | 40 | 20 | 120 | 32 |
| Elvacite 2013 | 39.9 | 20 | 41.6 | 20 | 74.4 | 20 |
| Mod flow | 0.3 | — | 0.3 | — | 0.4 | — |
| MDI | 59.3 | 30 | 66.2 | 30 | 97.6 | 26 |
| % Free NCO | 7.0 | | 7.0 | | 5.6 | |
| Color | Translucent White | | Translucent White | | Translucent White | |
| Viscosity | | | | | | |
| @room temperature | Solid | | Solid | | | |
| @200° F. | 5,000 | | 5,000 | | 12,900 | |
| @225° F. | 2,600 | | 2,500 | | 6,500 | |
| @250° F. | 1,500 | | 1,400 | | 3,600 | |
| Green Peel | | | | | | |
| @5 minutes | 0.7 | | 0.8 | | 1.2 | |
| Failure | Cohesive | | Cohesive | | Film Tear | |
| Peel | | | | | | |
| @24 hours | 1.1 | | 1.1 | | 1.1 | |
| Failure | Film Destruction | | Film destruction | | Film Tear | |
| Pasteurizer Performance | Pass | | Pass | | Pass | |

We claim:

1. A process for applying heat shrink film to containers comprising the steps of:
   a) coating at least a portion of a heat shrinkable but unshrunken film segment with a reactive hot melt polyurethane adhesive having a free isocyanate content greater than 2% and a viscosity less than 3000 cps at 225° F.;
   b) applying the film to the longitudinal surface of the container;
   c) subjecting the container to heat to shrink the film onto the container so as to permanently affix it thereto; and
   d) subsequently subjecting the labelled container to a heating step.

2. The process of claim 1 wherein the hot melt adhesive composition additionally contains 0.05 to 1% by weight of a polyurethane catalyst.

3. The process of claim 1 wherein the hot melt adhesive is applied to a narrow region of the container or of the leading end of the film segment to secure the leading end of the film to the container, the film wrapped around the container and the film segment secured to the container by overlapping the trailing end, a narrow region of which has been coated with the hot melt adhesive.

4. The process of claim 1 wherein the urethane hot melt adhesive is prepared by the condensation polymerization of a polyisocyanate with a polyol.

5. The process of claim 4 wherein the polyisocyanate is selected from the group consisting of ethylene diisocyanate, ethylidene diisocyanate, propylene diisocyanate, butylene diisocyanate, hexamethylene diisocyante, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4''-triisocyanatotriphenylmethane, 1,3,5-triisocyanato-benzene, 2,4,6-triisocyanatotoluene, and 4,4'-dimethyldiphenylmethane-2,2'5,5-tetraisocyanate, and the polyol is selected from the group consisting of polyhydroxy ethers, polyhydroxy polyesters, the ethylene or propylene oxide adducts of polyols and the mono-substituted esters of glycerol.

6. The process of claim 1 wherein the urethane polymer is characterized by a free isocyanate content of 2 to 10% and the isocyanate index is greater than 1 but no more than 3.5.

7. The process of claim 1 wherein the hot melt adhesive contains 10 to 95% of a polymer of ethylenically unsaturated monomers containing no active hydrogen.

8. The process of claim 1 wherein the hot melt adhesive additionally contains up to 40% by weight of a tackifying resin.

9. The process of claim 8 wherein the tackifying resin is present in an amount of 5 to 30% by weight.

10. The process of claim 8 wherein the tackifying resin is selected from the group consisting of glycerol and pentaerythritol esters of natural and modified rosins; copolymers and terpolymers of natural terpenes; polyterpene resins having a softening point, as determined by ASTM method E28-58T, of from about 60° to 150° C.; phenolic modified terpene resins and hydrogenated derivatives thereof; aliphatic petroleum hydrocarbon resins having a Ball and Ring softening point of from about 60° to 135° C.; aromatic petroleum hydrocarbon resins and the hydrogenated derivatives thereof; and alicyclic petroleum hydrocarbon resins and the hydrogenated derivatives thereof.

* * * * *